Figure 4:
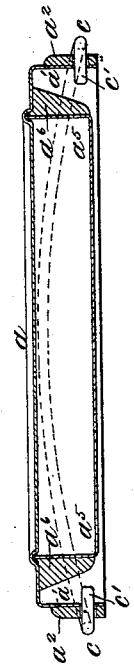

(No Model.) 2 Sheets—Sheet 1.

N. THOMPSON.
STOPPER FOR BOTTLES AND JARS.

No. 279,891. Patented June 19, 1883.

Attest:
D. W. Hopkins.
Wm. J. Sayers.

Inventor:
Nathan Thompson.
By Knight Bros.
Attys.

N. PETERS. Photo-Lithographer, Washington, D. C.

(No Model.) 2 Sheets—Sheet 2.
N. THOMPSON.
STOPPER FOR BOTTLES AND JARS.
No. 279,891. Patented June 19, 1883.

Attest:
D. M. Hopkins
Wm. J. Sayers

Inventor:
Nathan Thompson
By Knight Bros
Attys.

UNITED STATES PATENT OFFICE.

NATHAN THOMPSON, OF BROOKLYN, NEW YORK.

STOPPER FOR BOTTLES AND JARS.

SPECIFICATION forming part of Letters Patent No. 279,891, dated June 19, 1883.

Application filed January 3, 1883. (No model.) Patented in England September 2, 1882, No. 4,185.

*To all whom it may concern:*

Be it known that I, NATHAN THOMPSON, a citizen of the United States of America, residing at Brooklyn, in the county of Kings and State of New York, in the United States of America, have invented certain new and useful Improvements in Stoppers for Bottles, Jars, and other Hollow Articles, (for which I have received Letters Patent in Great Britain, No. 4,185, dated September 2, 1882,) of which the following is a specification.

According to my present invention, I form the bail or handle, preferably, of steel or other sufficiently flexible and elastic wire bent to the required shape to enable it to lie partially around the head-piece or cap of the stopper, or in some cases around the neck of the bottle, and having turned-in ends passing through corresponding holes in the sides of the cap; so as to serve as pivots upon which the handle can turn, such pivot ends being of such a length as to permit of their projecting inward underneath a flange or into a groove round the bottle-neck when in the locking position, and of being released from such flange or groove when it is required to remove the stopper from the bottle.

I employ my improved stopper in connection with a bottle, jar, or other vessel provided with a groove or flange, as above described, round the neck, which latter is formed conical or inclined on its upper outer edge or surface, so that by pressing the stopper downward onto the said neck the pivot ends of the bail or handle shall be first forced outward, and then when the stopper has descended fully into position the said pivot ends shall spring inward into the groove or underneath the flange, and thus lock the stopper in position; and in order to facilitate the release of the stopper I form the head-piece or cap thereof with projections, and I bend the ends of the bail or handle to such a shape that as the latter is being raised or turned upward for the purpose of enabling the stopper to be removed, they are forced outward, so as to withdraw the pivot ends from the groove or flange on the bottle-neck, and thus release the stopper; or in some cases the ends of the bail or handle may be so shaped as to be opened outward by coming in contact with the upper part of the capsule, or with the flange on the bottle-neck, or partly with the latter and partly with the capsule. The projections on the capsule also assist in preventing the bail or handle from becoming disconnected from the cap of the stopper by its pivot ends being separated too far. The stopper may consist simply of a cap having a disk or ring of cork fitted in its interior; or it may consist of an outer cap provided with an inner reversed cap, or with a ring surrounded with a strip or a ring of cork, or serving to hold a solid cork.

And in order that my said invention may be more clearly understood and readily carried into effect, I will proceed, aided by the accompanying drawings, more fully to describe the same.

Figure 3:
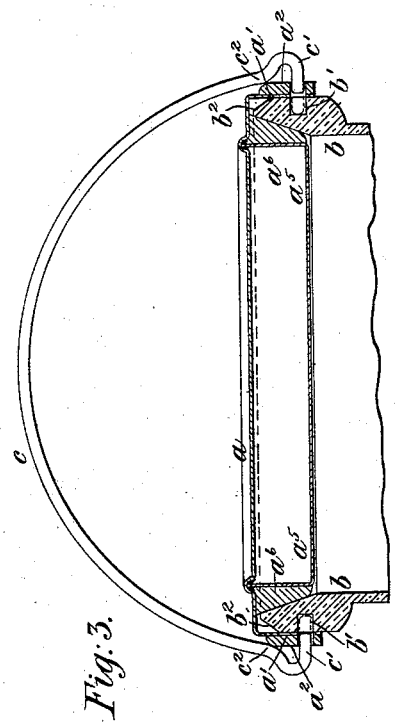
Figure 1:
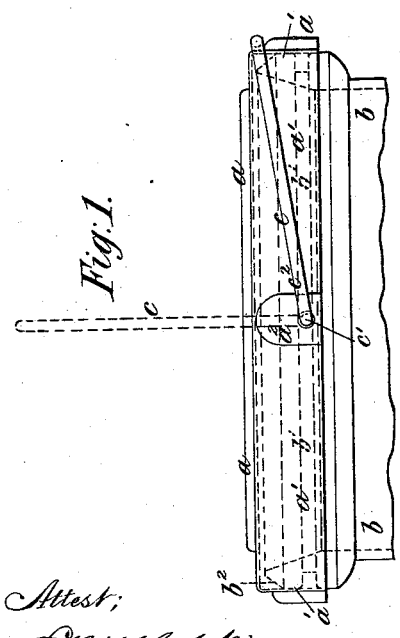
Figure 2:
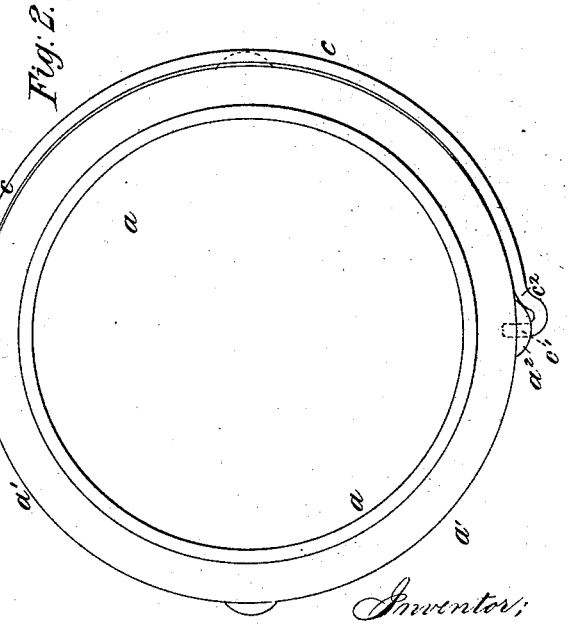
Figure 5:
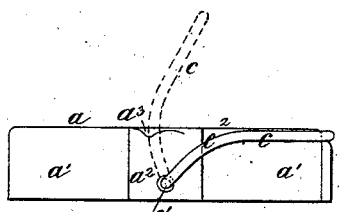
Figure 6:
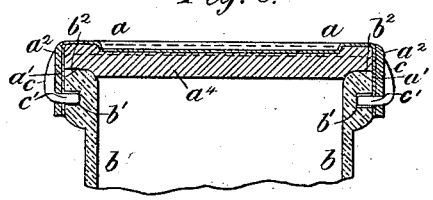
Figure 7:
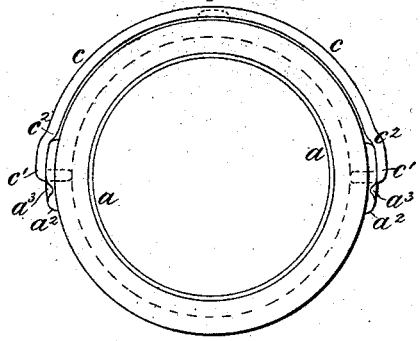

In the drawings, Figure 1 is a side elevation, Fig. 2 is a plan, and Figs. 3 and 4 are cross-sections, of a stopper constructed according to my invention, and fitted with a descending portion to enter the mouth of a bottle, jar, or other hollow article; and Fig. 5 is a side elevation; Fig. 6 is a cross-section, and Fig. 7 is a plan, of a stopper constructed according to my invention, and fitted with a disk of cork or other suitable material, forming a packing in the crown thereof, so as to press on the top of the neck of a bottle or other hollow article.
Figs. 8, 9, 10, 11, and 12 represent slight modifications.

In all the figures like parts are marked with similar letters of reference.

*a* is a hollow cap, the cylindrical portion *a'* of which is formed to fit over the upper end, *b*, of the neck of a bottle, jar, or other hollow article.

Figure 8:
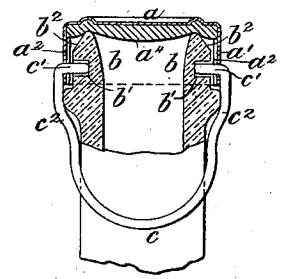
Figure 9:
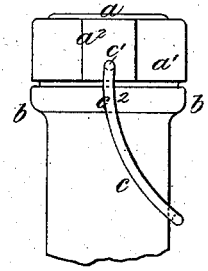
Figure 10:
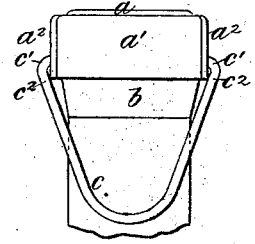
Figure 11:
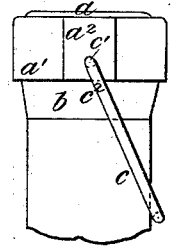

*c* is a bail or handle, which I preferably form of steel or other sufficiently flexible and elastic wire bent to the required shape to enable it to lie partially around the cylindrical part *a'* of the head-piece or cap of the stopper, as shown at Figs. 1 to 7; or in some cases—for instance, for small bottles—such bail or handle may be so shaped as to lie closely around the neck of the bottle, as shown at Figs. 8 and 9, or such bail or handle may be formed with all parts thereof lying in the same plane, as shown at Figs. 10 and 11, whereby its manufacture is facilitated and cheapened. The bail or handle *c* is formed with turned-in ends, $c'$, which pass through corresponding holes in the sides $a'$ of the cap, and serve as pivots for the bail or handle, such pivot ends $c'$ being of such a length as to permit of their coming underneath a flange or into a groove, $b'$, on the bottle-neck when in the locking position, as shown at Figs. 4 and 6, and of being withdrawn and released from such flange or groove $b'$, as shown at Fig. 3, when it is required to remove the stopper from the bottle or other article to which it is applied.

I employ my improved stopper in connection with a bottle, jar, or other hollow article provided with a groove or flange, $b'$, as described, round the neck, which latter is formed conical or inclined on its upper outer edge or surface, $b^2$, so that by pressing the stopper downward onto the said neck, the bail or handle $c$ being at such time in its locking position, the pivot ends $c'$ of the bail or handle $c$ shall be first forced outward, and then when the stopper has descended fully into position the said pivot ends $c'$ shall spring inward by the elasticity of the bail or handle into the groove $b'$ or underneath the flange on the bottle-neck, and thus lock the stopper in position; and in order to facilitate the release of the stopper when required, I form the head-piece or cap $a$ thereof with projections $a^2$, and I bend the ends of the bail or handle $c$ at $c^2$ to such a shape that as the said bail or handle $c$ is being raised or turned upward for the removal of the stopper its ends $c^2$ are forced outward by coming into contact with such projections $a^2$, and the pivot ends are thereby withdrawn and released from the groove or flange $b'$ on the bottle-neck; or in some cases the ends of the bail or handle are so shaped as to be opened out by coming against the upper part of the capsule $a$ itself; or they may be opened out by coming against a flange or projection formed on the bottle-neck below the capsule $a$, as shown at Figs. 8 and 9, or partly by the latter and partly by the capsule itself, as will be readily understood. The projections $a^2$ on the capsule $a$ also serve to prevent the liability of the bail or handle $c$ becoming entirely disconnected from the cap of the stopper, as in no case can the pivot ends $c'$ be drawn out of said projections $a^2$ by the mere raising and lowering of the bail or handle $c$. I also prefer to make a notch or recess, $a^3$, as shown at Fig. 5, in each of the projections $a^2$, to limit the amount of motion given to the bail or handle $c$ in raising the same.

The stopper may consist simply of a cap, $a$, with a disk or ring of cork, $a^4$, in the interior thereof, as shown in Figs. 6 and 8; or it may consist of an outer cap, $a$, provided with an inner reversed cap, $a^5$, as shown at Figs. 3 and 4, or simply with a ring in lieu of such reversed cap $a^5$, surrounded with a strip or a ring of cork, $a^6$; or in the case where a metal ring is used it may be employed to hold a cork which enters the mouth of the bottle or other article, as will be readily understood.

I would remark that in all the arrangements above described the pivot ends $c'$ of the bail or handle $c$ tend, by the elasticity of the latter, to spring inward or toward each other, so as to assume the locking position, by which means the stopper becomes automatically locked on the bottle-neck by pressing it downward with sufficient force, the pivot ends $c'$ being first forced outward by pressure against the incline $b^2$ on the bottle-neck, and, when they have passed such incline, springing inward into the groove $b'$ or under the flange on the bottle-neck.

Figure 12:
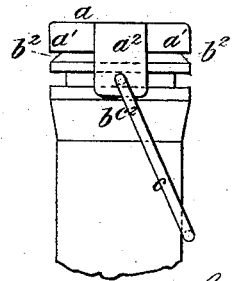

I have found that the necks of bottles and other vessels, although made to a given size, frequently vary slightly in form from the true circle, in which cases stoppers constructed as shown in Figs. 1 to 11, and of the proper size for such vessels, cannot sometimes be applied thereto, thereby necessitating the employment in such cases of stoppers of larger size than would be necessary were the necks of such vessels truly circular in form. To obviate this difficulty and to enable stoppers of the proper size to be applied to the necks of all vessels of a given size, although slightly varying in form, I construct the stopper as shown at Fig. 12, in which case the cylindrical portion $a'$ of the cap $a$ is formed shorter than in the other cases; but the projections $a^2$, carrying the pivoted bail or handle $c$, are caused to project downward the required distance, as shown. By these means the cylindrical part $a'$ of the cap $a$ does not descend so far as the bottom part of the incline top $b^2$ of the neck of the bottle, and therefore does not impede the application of the stopper to vessels of the proper size, but whose necks vary slightly from the true circle.

Having thus described the nature of my said invention and the mode in which I carry the same into effect, I would have it understood that what I claim is—

1. The combination, with a vessel having a flange around its neck, of a cap having a bail or handle provided with bends $c^2 c^2$, fitting beneath projecting portions of the cap and turned-in ends secured to the cap, and adapted to engage through said cap with the flange of the vessel, when in its horizontal or nearly horizontal position, to lock the cap to the vessel, and when in its vertical or elevated position to be unlocked from the vessel, as set forth.

2. The combination, with a vessel having a suitable flange, of a cap having projecting portions, and a bail or handle provided with bends $c^2$ and turned-in ends $c'$, pivoted to the cap, the ends adapted to engage with the vessel beneath the flange to lock the cap, and the bends adapted to act against the projecting portions of the cap to expand the bail or handle when the latter is raised to release the ends from the flange to unlock the cap, as set forth.

3. The combination of a vessel having a flange formed with conical upper edge, and a cap having a bail or handle provided with turned-in ends penetrating the sides of the cap, the conical upper edge of the flange adapted to press out the ends of the bail or handle when the cap is applied to the vessel, and then permit the ends to spring beneath the flange, as set forth.

4. A cap or stopper having a flange, and a bail or handle provided with bends $c^2 c^2$, fitting beneath projecting portions of the cap, and turned-in ends penetrating said flange and adapted to engage with recesses in the neck of a vessel when in horizontal position, and to be disengaged from the vessel when in its elevated position, as set forth.

5. A stopper or cap consisting of cylindrical portion $a'$, inner cap, $a^5$, ring $a^6$, projections $a^2$, and a bail or handle, $c$, having bends $c^2$ and turned-in ends $c'$, penetrating the cylindrical portion.

NATHAN THOMPSON.

Witnesses:
B. J. B. MILLS,
B. M. WHITE.